(No Model.)
C. W. NASON.
STEAM TRAP.
No. 521,962. Patented June 26, 1894.
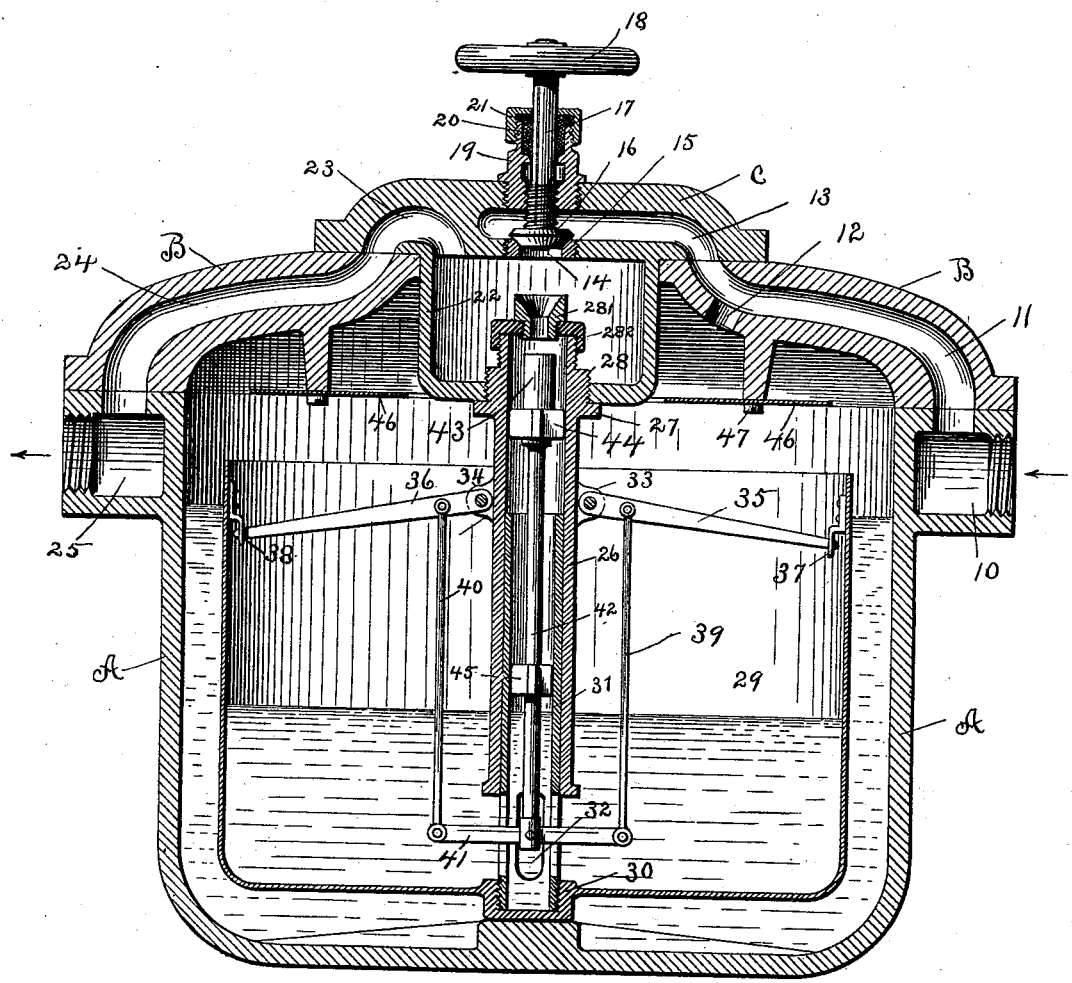
Witnesses
Inventor
Carleton W. Nason,
By Attorneys Southgate & Southgate

UNITED STATES PATENT OFFICE.

CARLETON W. NASON, OF NEW YORK, N. Y.

STEAM-TRAP.

SPECIFICATION forming part of Letters Patent No. 521,962, dated June 26, 1894.

Application filed February 19, 1894. Serial No. 500,666. (No model.)

*To all whom it may concern:*

Be it known that I, CARLETON W. NASON, a citizen of the United States, residing at New York, in the county of New York and State of New York, have invented a new and useful Improvement in Steam-Traps, of which the following is a specification.

The object of my invention is to provide a steam trap which shall be positive in its operation, and which will be less liable to leak than are steam traps as now constructed; and the especial aim of my invention is to improve the construction of steam trap shown in the patent to David Saunders, No. 72,088, granted December 10, 1867.

To these ends, my invention consists of the parts and combinations of parts, as hereinafter described, and more particularly pointed out in the claims at the end of this specification.

The accompanying drawing shows a central transverse section of a steam trap constructed according to my invention.

Referring to the drawing and in detail, A designates the casing of the trap.

B designates the main cover, and C designates an additional or supplemental cover.

The casing A is provided with an inlet 10, which connects with a passage 11 formed in the cover B, and the steam and water passing through the passage 11 enter the steam trap through the orifice 12. The passage 11 also connects with a chamber 13 formed in the supplemental cover C. The chamber 13 connects by a passage 14 with the chamber 22 of the cover B. The passage 14 is provided with a valve-seat 15, which co-operates with a normally closed valve 16 carried by a valve-stem 17, the valve-stem being provided with a suitable hand-wheel as 18. The valve-stem 17 is threaded into a suitable stuffing box 19, which is threaded into the supplemental cover C, and carries a suitable packing ring 20, which is secured in place by a threaded cover 21. The chamber 22 connects with a passage 23 formed in the supplemental cover C, and the passage 23 connects with the passage 24 formed in the cover B, the passage 24 being connected with the outlet passage 25, which is formed in the trap casing. Whenever it is desired to clear out the passages through the steam trap, the valve 16 may be opened, and the steam and water may be allowed to pass from the chamber 13 through the outlet passages, as described, and will effectively blow out or clear the same.

26 designates a central pipe or guide, which is provided with a shoulder 27, and is threaded into the walls of the chamber 22 as at 28, and carries at its upper end a threaded cover 282 carrying a threaded valve-seat 281.

29 designates a float, which may be made of sheet metal and is preferably provided with a lug or enlargement 30 near its center. Threaded into the lug 30 is a pipe or guide 31, which is provided with inlet openings 32.

The parts so far described are somewhat similar to the parts shown in the patent to Saunders, No. 72,088, above referred to, but instead of having the valve of the steam trap carried directly by the pipe 31, I preferably employ a system of levers, which are actuated by the float, and which will more positively close the valve, and will hold it against its seat more firmly.

The central pipe or guide 26 is provided with ears 33 and 34. Pivoted in the ears 33 and 34 are levers 35 and 36, which are connected to the sides of the float by means of slotted brackets 37 and 38.

Pivoted to the levers 35 and 36 are the links 39 and 40, which are connected at their lower ends to a cross piece 41. Pivoted to the cross piece 41 is the valve spindle 42, which carries at its upper end a valve 43 co-operating with the valve seat 281. The valve stem 42 moves up and down inside of the pipes or guides 26 and 31, and is centered and held in position by means of guide-wings 44 and 45.

In order to prevent the steam and water, coming through the orifice 12, from impinging directly upon the float 29 and preventing the same from rising, I provide an annular deflector plate 46, which is secured to the cover B by means of the screws 47, as shown.

When the steam trap is in use, it is placed lower than the apparatus or system which it is desired to drain, and is connected thereto by the inlet passage 10. The valve 16 being closed, the steam and water enter through the orifice 12, and as the water collects within the float 29 the same falls, and through the levers 35 and 36 opens the valve 43. The pressure of the steam upon the surface of the water within the float forces the water up inside of the pipes 31 and 26 through the valve-seat 281, and out through the passages 23, 24, and 25. When the water has been nearly exhausted from the float 29, the float is allowed to rise, and through the levers 35 and 36, the valve 43 is closed.

The levers which are preferably employed in my improved steam trap are constructed so that the valve 43 moves about one-fifth of the distance traversed by the float 29. It will thus be seen that the valve is more positively operated, and that there is less liability for the same to become stuck, and rendered inoperative. It is also to be noted that the valve 43 is held up against its valve-seat with about five times the pressure, due to the buoyancy of the float, and hence there will be less liability of any leakage, which will allow the escape of steam.

I am aware that many changes may be made in the construction of my improved steam-trap, by those who are skilled in the art, and I do not wish to be limited to the exact construction which I have shown and described.

What I do claim, and desire to secure by Letters Patent of the United States, is—

1. In a steam trap, the combination of a float, a valve spindle, a guide or pipe inclosing said spindle, second class levers pivoted to said guide, and operated by the float, and connections between said levers and the valve spindle, substantially as described.

2. In a steam trap, the combination of a casing, a cover for said casing having a central guide or pipe provided with a valve seat, a valve spindle having guide wings located inside of said central guide and pivoted to a cross piece, a float guided by said central guide, second class levers actuated by said float, and links connecting the levers and said cross-piece, substantially as described.

3. In a steam trap, the combination of a casing, a cover for said casing, a central valve spindle, a guide for said valve spindle carried by the cover of the casing, a float, second class levers pivoted to the guide and connected to said float and actuating said valve spindle, substantially as described.

In testimony whereof I have hereunto set my hand in the presence of two subscribing witnesses.

CARLETON W. NASON.

Witnesses:
JOHN J. MURRAY,
SAMUEL GREASON.